United States Patent
Thorn et al.

(10) Patent No.: US 12,247,534 B2
(45) Date of Patent: Mar. 11, 2025

(54) HIGH FLOW INLINE AIR/FUEL VORTEX INJECTION SYSTEM FOR INTERNAL COMBUSTION ENGINES

(71) Applicant: ICOM North America LLC, New Hudson, MI (US)

(72) Inventors: Brandon Geoffrey Thorn, Fowlerville, MI (US); Albert Venezio, III, Walled Lake, MI (US)

(73) Assignee: ICOM North America LLC, New Hudson, MI (US)

( * ) Notice: Subject to any disclaimer, the term of this patent is extended or adjusted under 35 U.S.C. 154(b) by 0 days.

(21) Appl. No.: 18/633,585

(22) Filed: Apr. 12, 2024

(65) Prior Publication Data

US 2024/0254951 A1  Aug. 1, 2024

Related U.S. Application Data

(63) Continuation of application No. PCT/US2022/046532, filed on Oct. 13, 2022.

(Continued)

(51) Int. Cl.
*F02M 29/06* (2006.01)
*F02M 21/04* (2006.01)

(Continued)

(52) U.S. Cl.
CPC .......... *F02M 29/06* (2013.01); *F02M 21/042* (2013.01); *F02M 35/10216* (2013.01); *F02B 43/00* (2013.01)

(58) Field of Classification Search
CPC .. F02M 29/06; F02M 35/10216; F02M 21/04; F02M 21/042; F02B 43/00
See application file for complete search history.

(56) References Cited

U.S. PATENT DOCUMENTS

| 6,168,095 B1 | 1/2001 | Seitter et al. |
| 2002/0089072 A1* | 7/2002 | Rock .................... A61M 11/002 |
| | | 261/DIG. 55 |

(Continued)

FOREIGN PATENT DOCUMENTS

| KR | 20020054374 A * | 7/2002 |
| WO | 2009020353 A1 | 2/2009 |

OTHER PUBLICATIONS

International Search Report & Written Opinion of the International Searching Authority dated Jan. 31, 2023 for International Application No. PCT/US2022/046532.

(Continued)

*Primary Examiner* — Syed O Hasan
(74) *Attorney, Agent, or Firm* — Eschweiler & Potashnik, LLC (57) ABSTRACT

An air-fuel mixer includes a body having an inlet, an outlet, and an air passage therebetween. One or more fuel injectors are mounted to the body and positioned to inject fuel into the air passage with little or no space between the injector nozzles and the air passage. The fuel injectors may be inclined in an air-fuel mixer outlet direction whereby they inject fuel into the air passage with momentum in a direction of the outlet. Swirl guides are provided within the air passage. The air-fuel mixer may be installed between an intake manifold and an intercooler. The air-fuel mixer provides good mixing, low resistance to air flow, reduced fuel slip, and crisp responses to throttle up and throttle down commands.

17 Claims, 8 Drawing Sheets

Related U.S. Application Data

(60) Provisional application No. 63/255,506, filed on Oct. 14, 2021.

(51) Int. Cl.
*F02M 35/10* (2006.01)
*F02B 43/00* (2006.01)

(56) References Cited

U.S. PATENT DOCUMENTS

| | | | |
|---|---|---|---|
| 2015/0308366 A1* | 10/2015 | Melnyk | F02D 41/0025 |
| | | | 123/480 |
| 2016/0222921 A1* | 8/2016 | Helsel | F02M 35/10216 |
| 2017/0050242 A1 | 2/2017 | Melton | |
| 2022/0307436 A1* | 9/2022 | Kurtz | F02M 26/24 |

OTHER PUBLICATIONS

Olsson et al. "Experiments and Simulation of a Six-Cylinder Homogeneous Charge Compression Ignition (HCCI) Engine" SAE Technical Paper Series, published on Oct. 16, 2000.

* cited by examiner

HIGH FLOW INLINE AIR/FUEL VORTEX INJECTION SYSTEM FOR INTERNAL COMBUSTION ENGINES

REFERENCE TO RELATED APPLICATIONS

This application is a continuation of PCT/US2022/046532, filed on Oct. 13, 2022, which claims the benefit of U.S. Provisional Application No. 63/255,506, filed on Oct. 14, 2021, the contents of which are hereby incorporated by reference in their entirety.

FIELD

The present disclosure relates to port injection, direct injection, diesel pilot ignition and like systems for internal combustion engines.

BACKGROUND

An engine designed to operate on one type of fuel may be adapted to operate on an alternative fuel either together with the original fuel, in alternation with the original fuel, or in place of the original fuel. One option for providing the alternative fuel is port injection. Port injection may be into an intake manifold or into a pre-manifold air duct. The alternative fuel mixes with air and is drawn into the engine cylinders with the air for combustion.

SUMMARY

Some aspects of the present disclosure relate to an air-fuel mixer that provides good mixing, low resistance to air flow, reduced fuel slip, and crisp responses to throttle up and throttle down commands. The air-fuel mixer comprises a body having an air inlet, an air outlet, an air passage therebetween, and at least one fuel injector positioned to inject fuel into the air passage. The air-fuel mixer further comprises swirl guides within the air passage.

In some embodiments, the air-fuel mixer is installed in a powertrain upstream from an intake manifold for an internal combustion engine. In some embodiments, the air-fuel mixer is installed between an intercooler and the intake manifold. In some embodiments, a length of pipe connects the air-fuel mixer to the intake manifold. Having a length of pipe between the air-fuel mixer and the intake manifold may result in a more uniform mixture than placing the air-fuel mixer at the intake manifold. Pipe of the same diameter may connect the air-fuel mixer to the intercooler and the intercooler to a turbocharger. Placing the air-fuel mixer downstream from the intercooler avoids excessive attenuation of fuel pulses while still allowing for sufficient mixing.

The powertrain may have been designed and be operative independently from the air-fuel mixture. In some embodiments, the powertrain with the air-fuel mixer is a dual-fuel powertrain and includes primary fuel injectors for injecting a primary fuel into the intake manifold (port injection) or directly into the internal combustion engine (direct injection). In some embodiments, the internal combustion engine is a compression ignition engine.

A diameter of the air outlet of the air-fuel mixer may be matched in size to a diameter of pipe used between the turbocharger and the intake manifold. In some embodiments, a cross-sectional area of the air inlet and a cross-sectional area of the air outlet are greater than or equal to a cross-sectional area of the pipe. In some embodiments, the cross-sectional area of the air inlet and the cross-sectional area of the air outlet are no more than twice the cross-sectional area of the pipe. In some embodiments, the cross-sectional area of the air inlet and a diameter of the air outlet are no more than 50% larger than the cross-sectional area of the pipe. In some embodiments, the cross-sectional area of the air inlet and a diameter of the air outlet are equal to the cross-sectional area of the pipe. These dimensions relate to sizing the air-fuel mixture so as to neither excessively obstruct the intake air flow nor add excessive volume within which injected fuel may stagnate. The air inlet and the air outlet of the air-fuel mixer may have the same cross-sectional area and the air passage may have at least that cross-sectional area throughout in order that the air-fuel mixer does not significantly reduce the draw of the intake manifold.

The air-fuel mixture may provide a substantially unobstructed path from the air inlet to the air outlet, particularly along its centerline. The air passage may comprise a core volume extending from the air inlet to the air outlet. The core volume may have a cross-section corresponding to the air inlet, to the air outlet, or to both. In some embodiments, about 75% or more of the core volume as viewed from the air inlet is unobstructed. In some embodiments, about 90% or more of the core volume as viewed from the air inlet is unobstructed.

In some embodiments, the air-passage widens between the air inlet and the air outlet to provide a peripheral volume around the core volume. In some embodiments, at least half a volume of the air passage taken up by the swirl guides is in the peripheral volume. This configuration allows the swirl guides to impart swirl without excessively increasing back pressure.

In some embodiments the air passage has a cross-sectional area that has a maximum between the air inlet and the air outlet. In some embodiment, the maximum is no more than about four times a minimum of the cross-sectional area. In some embodiment, the maximum is no more than about twice the minimum. The minimum may occur proximate the air inlet, proximate the air outlet, or at both locations. If the maximum is too large, air stagnation within the air-fuel mixer may be excessive.

Fuel injected through the fuel injector enters the air passage through a port in the body. In some embodiments, the air passage is wider where the port meets the air passage than at the air inlet or the air outlet. In some embodiments, the air passage has an internal wall that is slanted where it meets the port so that the air passage is widening where it meets the port. Having the passage widening proximate the port may create air flow patterns that promote mixing.

In some embodiments, the fuel injector is one of a plurality of fuel injectors that are mounted to the air-fuel mixer. In some embodiments, there are six or more of the fuel injectors. Increasing the number of fuel injectors increases a range over which a total fuel injection rate may be precisely controlled.

In some embodiments, two or more of the fuel injectors are provided by one fuel rail. In some embodiments, two or more of the fuel injectors have nozzles in parallel. Fuel rails with multiple fuel injectors having nozzles in parallel are off-the-shelf parts. In other words, the fuel injectors and/or the fuel rails may be products designed independently from the air-fuel mixer. Using off-the-shelf parts reduces costs.

In some embodiments, a fuel rail or an individual fuel injector abuts a flat outer surface of the body. The flat outer surface of the body may have a surface normal parallel to the nozzle angle. The flat outer surface may facilitate installing the fuel injector with the nozzle oriented at a desired angle with respect to the air passage.

In some embodiments, the nozzle is at a first angle with respect to the air passage so that fuel entering the air passage through the nozzle has momentum in a direction of the air outlet. This first angle relates to how far the nozzle is tilted away from perpendicular to an axis of the air passage and toward the air outlet. The momentum reduces a residence time of the fuel within the air-fuel mixer and improves the sharpness with which a secondary fuel flow to the engine may be cut off. In some embodiments, a second angle of the nozzle causes the fuel entering the air passage through the nozzle to swirl as it traverses the air passage. This second angle may be obtained by tilting the nozzle away from pointing at the axis of the air passage without increasing or decreasing the first angle.

The fuel injector includes a valve seat and a nozzle. In some embodiments, the valve seat is within or in direct contact with the nozzle. The distance from that valve seat to the air passage is kept small. In some embodiments, the valve seat is outside the air passage but is within about 3 cm of the air passage. In some embodiments, the valve seat is outside the air passage but is within about 1 cm of the air passage. In some embodiments, the port is a bore and the nozzle has an outlet within the bore. In some embodiments, the outlet of the nozzle is at a perimeter of the air passage. In some embodiments, the outlet of the nozzle projects into the air passage. In some embodiments, the outlet of the nozzle projects about one centimeter or less into the air passage. These configurations limit an extent to which the fuel injector and its nozzle obstruct flow through the air passage and limit volume between the valve seat and the air passage in which fuel may stagnate. If the nozzle is in a bore, the bore may have the same orientation as the nozzle.

The swirl guides include surfaces that redirect air flowing through the air passage so as to increase its swirl. In some embodiment, the swirl guides are downstream from the port. In some embodiment, the swirl guides comprise surfaces that slant toward a center of the air passage so as to guide air flowing from the inlet to the outlet toward a center of the air passage. In some embodiments, these slanted surfaces are within a portion of the air passage through which the cross-section of the air passage is narrowing.

The swirl guides may be fins, blades, paddles, the like, or any other structure that is operative to impart a swirl to air flowing through the air passage without excessively inhibiting air flow. In some embodiments, the swirl guides comprise fins, blades, or paddles. In some embodiments, the swirl guides have a helical structure.

In some embodiments, the swirl guides are provided by a unitary structure that extends about a perimeter of the air passage. In some embodiments, the body comprises a first part and a second part that are attached together. The first part and the second each part define a portion of the air passage. In some embodiments, the swirl guides are held between the first part and the second part.

In some embodiments, each of the fuel injectors comprises an electronically controlled valve. In some embodiments, the valves are solenoid valves. In some embodiments, the valves are pintle valves. In some embodiments, the valves are pulse width modulated. A controller may batch fire the fuel injectors or fire them serially.

The injected fuel may be, for example, diesel, gasoline, compressed natural gas (CNG), liquid propane gas (LPG), methane ($CH_4$), dimethyl ether (DME), hydrogen ($H_2$), ammonia ($NH_3$), or the like. In some embodiments, the fuel is a gaseous fuel when not compressed. In some embodiments, the fuel is or comprises methane. In some embodiments, the fuel is a liquid that is atomized by the fuel injector. In some embodiments, the fuel is injected as a vapor.

The air-fuel mixer may be formed of any suitable material (s). In some embodiments, the material is a metal. The metal may be, for example, aluminum, steel, or the like. In some embodiments, the material is plastic, and the air-fuel mixer may be made by injection molding. The air-fuel mixer may be installed on an OEM vehicle to enable dual-fuel operation.

Some aspects of the present disclosure relate to a method of manufacturing an air-fuel mixer. The method includes forming a first part having a perimeter with an opening, forming a second part, clamping a swirl guide between the first part to the second part, and attaching the first part to the second part. The first part and the second part define an air passage and the swirl guide projects into the air passage. In some embodiments, the method includes attaching a fuel injector to the first part with a nozzle projecting into the opening. This method provides an efficient process that can be used to manufacture an air-fuel mixture according to the present disclosure.

In some embodiments, the method of manufacturing further includes forming a third part and attaching it to the first part. The third part defines an additional portion of the air passage and may be attached on an entrance side of the first part. The second part may be machined to provide an inner sidewall that slopes outward from a center of the air passage. Forming the third part separately from the first part facilitates that machining.

Some aspects of the present disclosure relate to a method of providing a secondary fuel to an engine. The method includes attaching fuel injectors directly to an air-fuel mixer, attaching the air-fuel mixer upstream of an intake manifold, and injecting fuel through the fuel injectors into an intake air stream running through the air-fuel mixer toward the intake manifold so as to generate an air-fuel mixture, and flowing the intake air stream over swirl guides within the air-fuel mixer. The swirl guides impart a swirl to the intake air stream. Attaching the fuel injectors directly to the air-fuel mixer reduces space from which fuel may gradually leak into the air stream after the fuel injectors have been shut off. In some embodiments, the fuel injectors are operated serially. This provides precise dosing control. In some embodiments, the fuel injectors are batch fired. This allows for high injection rates and facilitates timing fuel injections in relation to cylinder firings.

The primary purpose of this summary has been to present broad aspects of the present disclosure in a simplified form to facilitate understanding of the present disclosure. This summary is not a comprehensive description of every aspect of the present disclosure. Other aspects of the present disclosure will be conveyed to one of ordinary skill in the art by the following detailed description together with the drawings.

DETAILED DESCRIPTION

FIGS. 1-7 illustrate an air-fuel mixer 100 according to some aspects of the present disclosure. The air-fuel mixer 100 comprises a body 105 defining an air passage 119 between an air inlet 101 and an air outlet 107. The air passage 119 includes a core volume 201 (see FIGS. 2 and 5). The core volume 201 is cylindrical and has a cross-section corresponding to cross-sections of the air inlet 101 and of the air outlet 107. The core volume 201 is more than 90% unobstructed.

Figure 1:
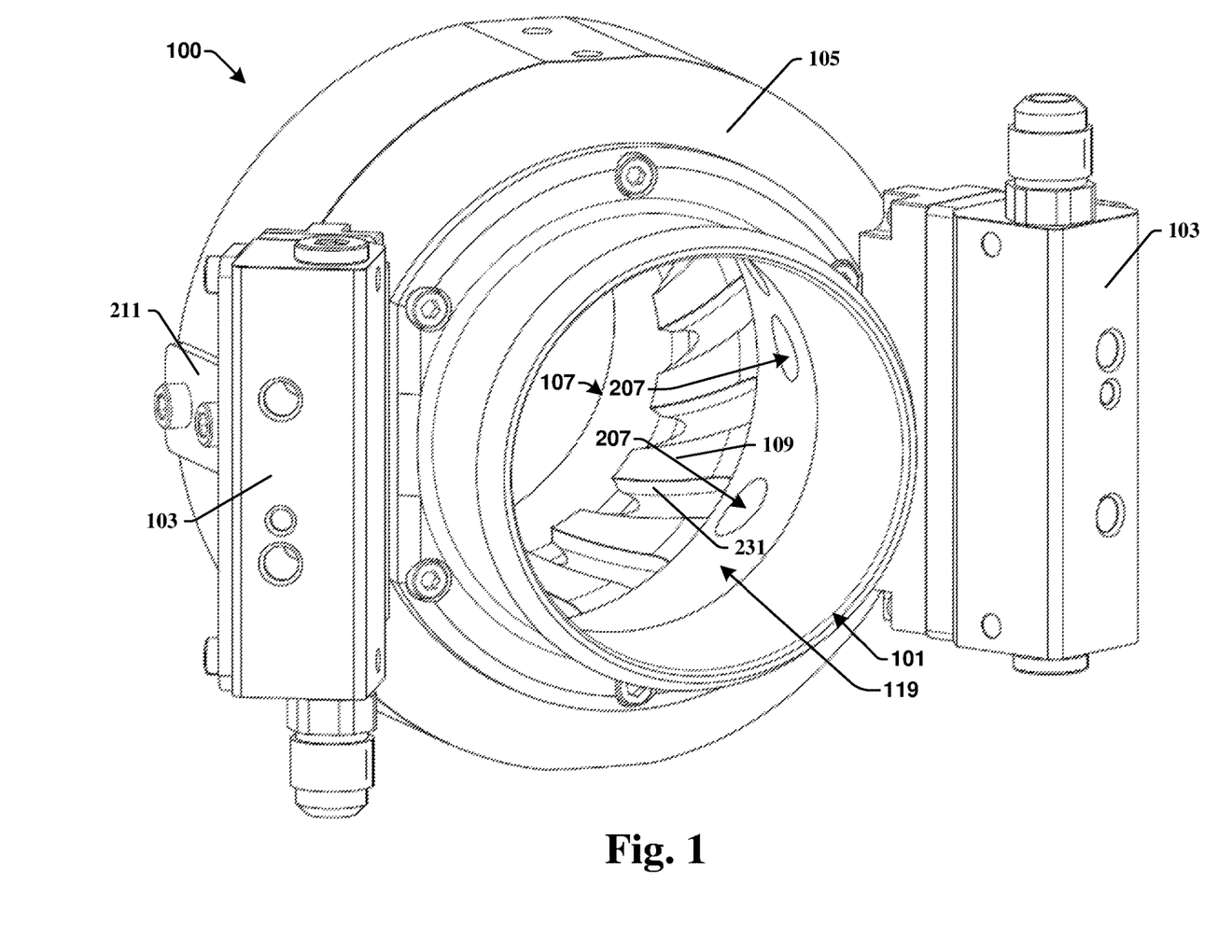
FIG. 1 illustrates a perspective view from the inlet side of an air-fuel mixer according to some other aspects of the present disclosure.
Figure 2:
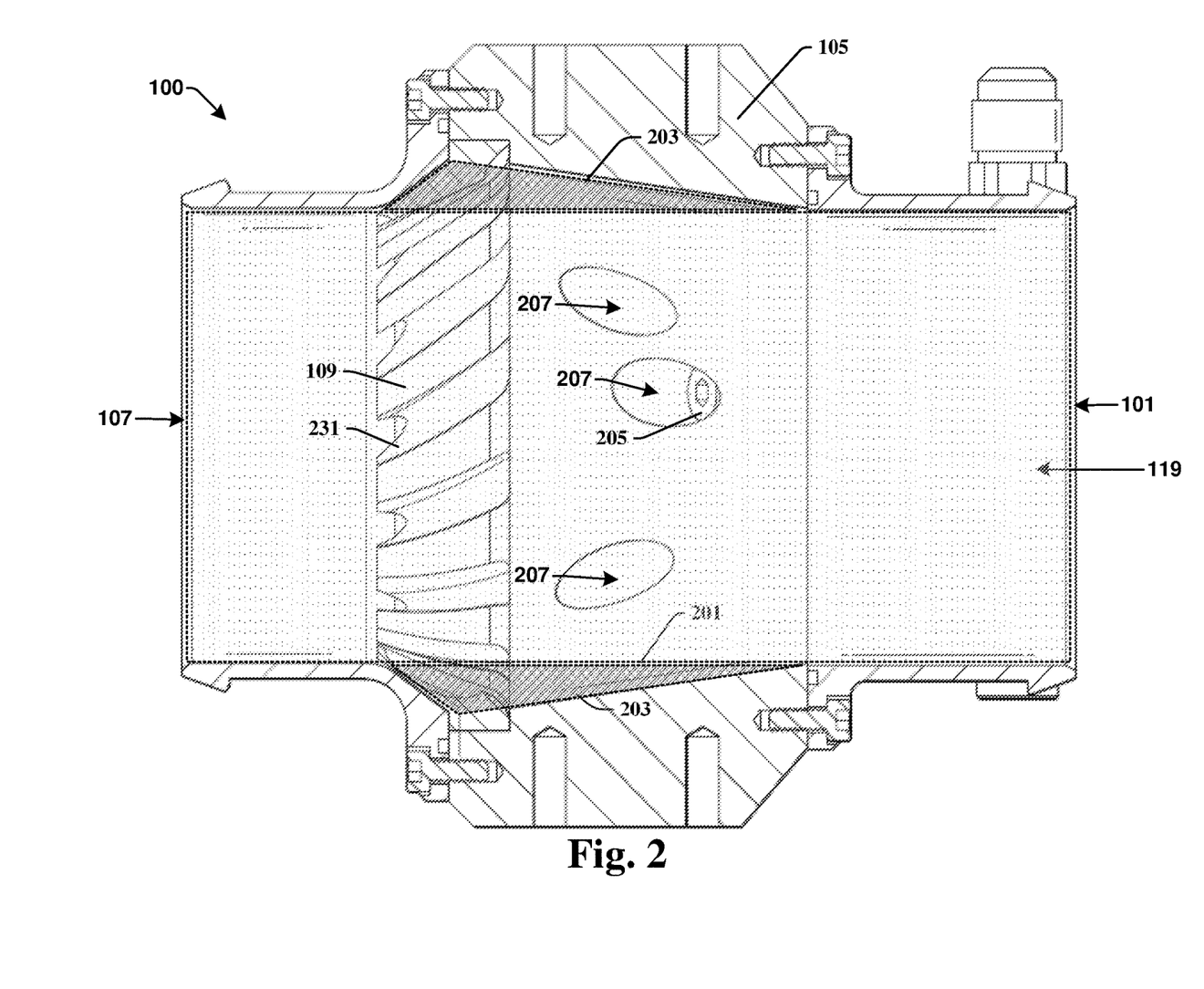
FIG. 2 illustrates a side cut-away view of the air-fuel mixer of FIG. 1.

The air passage 119 also includes a peripheral volume 203 (see FIG. 2). The peripheral volume 203 is 10% or less the core volume 201. Swirl guides 109 (see FIGS. 2 and 5) are project into the air passage 119 and protrude into the core volume 201, but a majority of a the volume of the swirl guides 109 that projects into the air passage 119 is in the peripheral volume 203.

Figure 7:
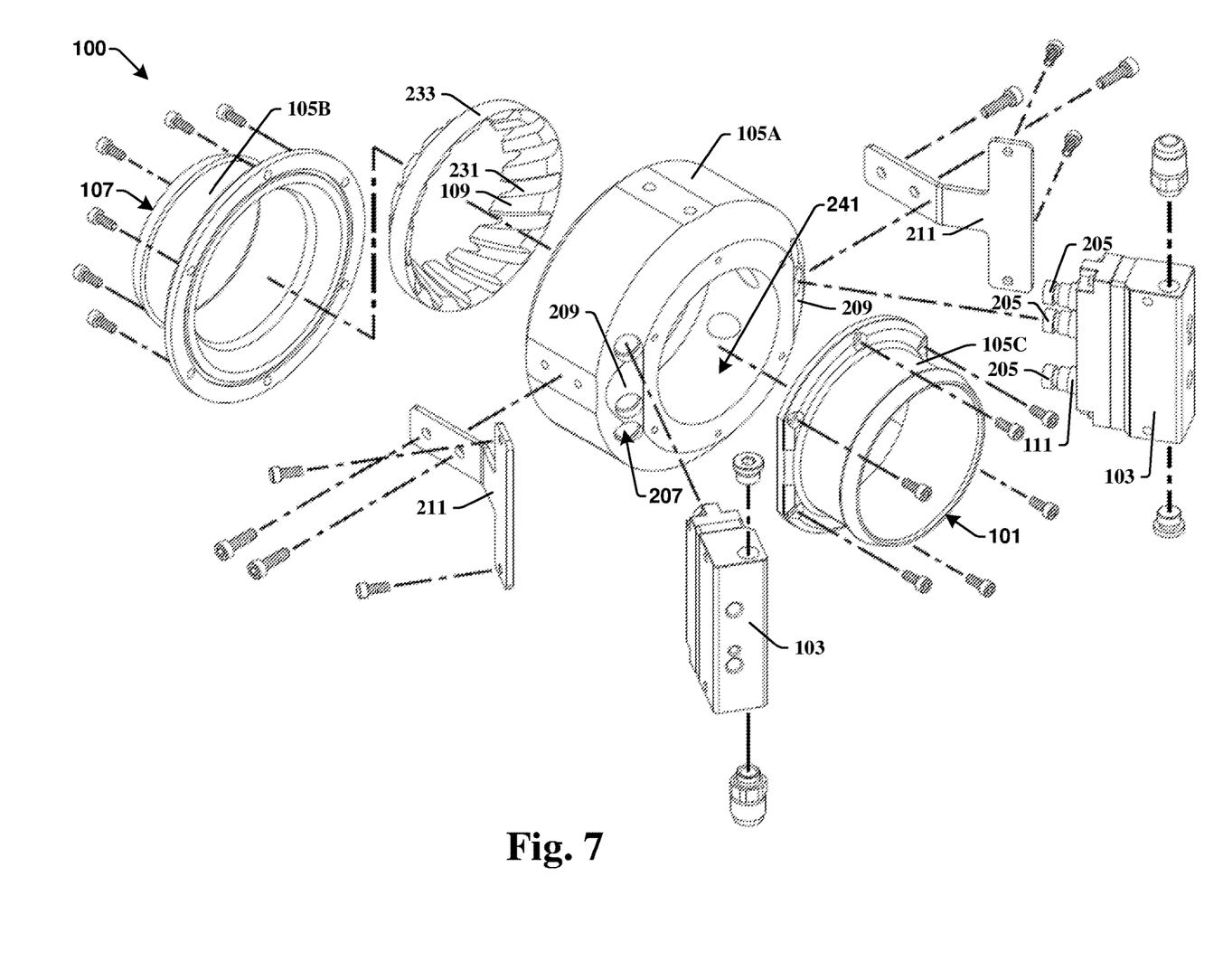
FIG. 7 illustrates an exploded view of the air-fuel mixer of FIG. 1.

The swirl guides 109 are fins projecting from a periphery of the air passage 119 and comprise surfaces 231 that are angled in such a way as to impart swirl to air flowing from the air inlet 101 to the air outlet 107. The swirl guides 109 are installed in an area where the air passage 119 in narrowing and slant toward a center of the air passage 119. With reference to FIG. 7, the swirl guides 109 are provided by a ring-shaped part 233 that encircles the air passage 119. The body 105 is composed of three parts, a main part 105A, and outlet part 105B, and an inlet part 105C each of which defines a portion of the air passage 119. The ring-shaped part 233 that includes the swirl guides 109 may be clamped between the main part 105A and the outlet part 105B.

Fuel rails 103 are attached to the body 105. The fuel rails 103 each comprise three fuel injectors 111 (see FIGS. 3 and 7). The fuel injectors 111 have nozzles 205 that have outlets within bores 207 that are formed in the body 105. The fuel rails 103 may rest against planar surfaces 209 (see FIG. 7) on the outside of the body 105 and may be held to the body 105 by brackets 211. The nozzles 205 of the three fuel injectors 111 of each fuel rail 103 may be parallel to each other and to a normal of the corresponding planar surface 209. The bores 207 may have orientations parallel to those of corresponding nozzles 205.

Figure 3:
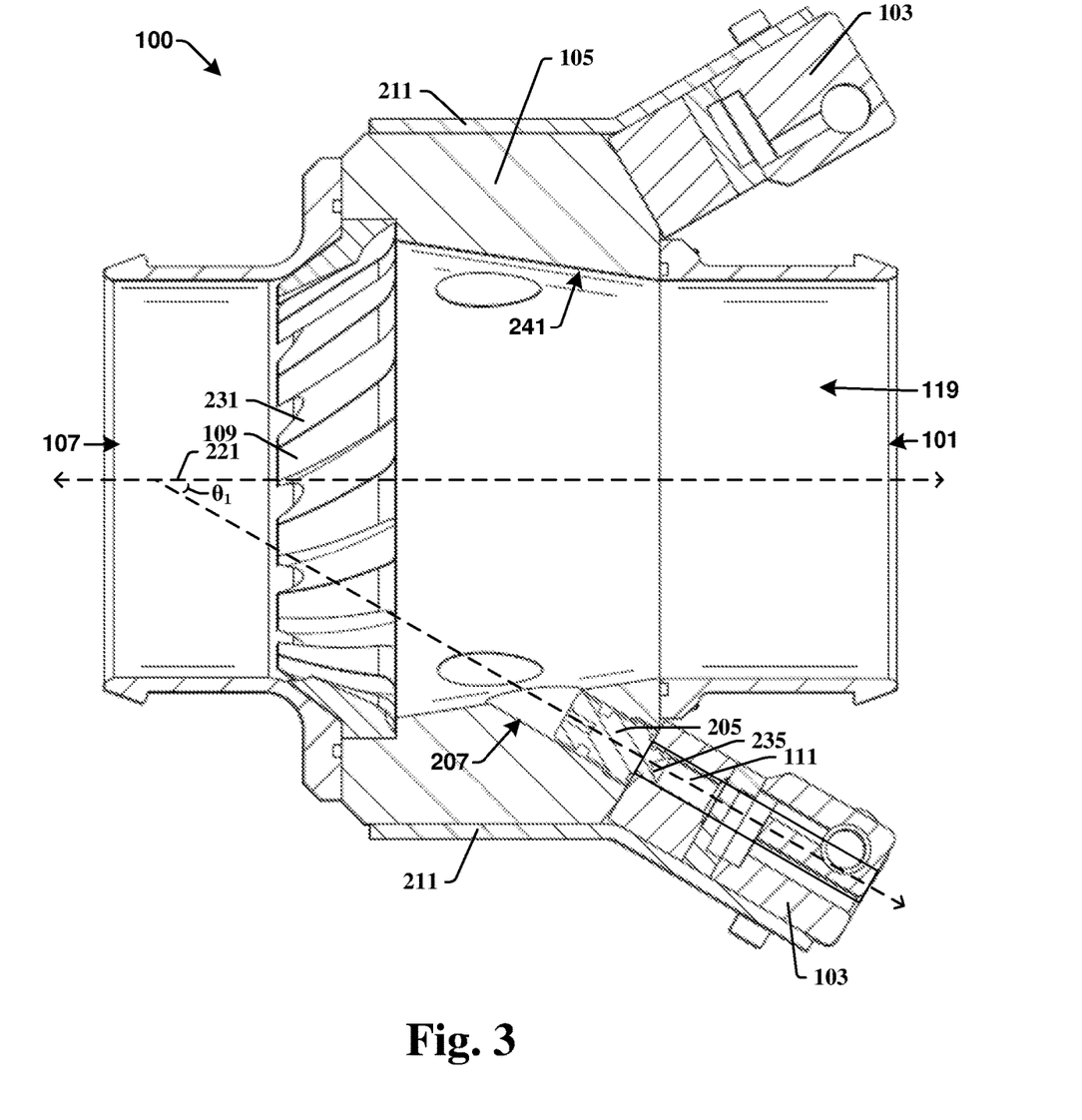
FIG. 3 illustrates another side cut-away view of the air-fuel mixer of FIG. 1 taken from a second angle.

With reference to FIG. 3, the bore 207 and the nozzle 205 are at an angle $\theta_1$ with respect to a centerline 221 of the air passage 119. The angle $\theta_1$ is an acute angle and give fuel passing through the fuel injector 111 momentum in an air inlet 101 to air outlet 107 direction. In some embodiments, the angle $\theta_1$ is about 45 degrees or less, e.g., about 30 degrees. The fuel injector 111 and the corresponding bore 207 may be tilted out of the plane of FIG. 3 so that passage through the fuel injector 111 also imparts swirl to the fuel flow.

Figure 4:
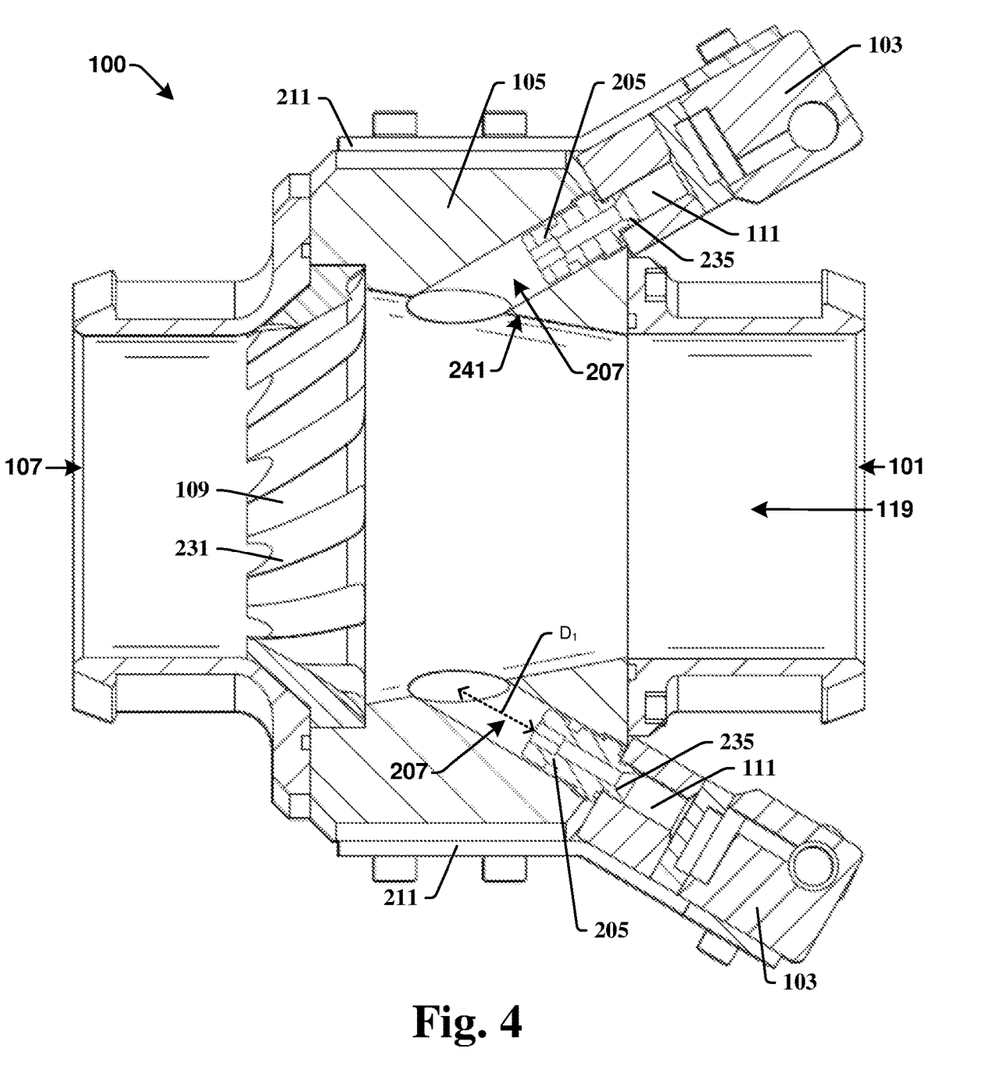
FIG. 4 illustrates another side cut-away view of the air-fuel mixer of FIG. 1 taken from a third angle.
Figure 5:
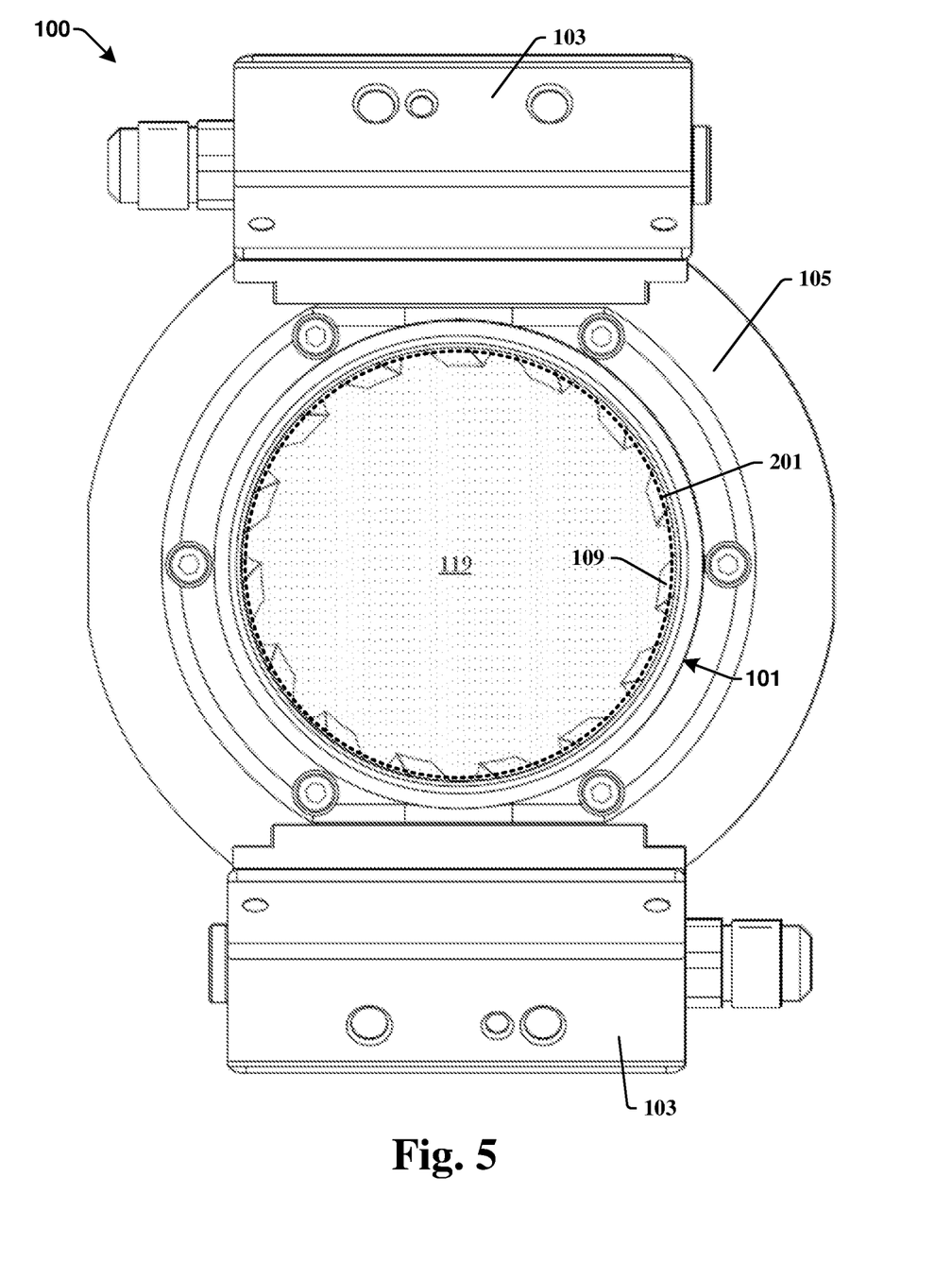
FIG. 5 illustrates a view of the air-fuel mixer of FIG. 1 from the inlet side.
Figure 6:
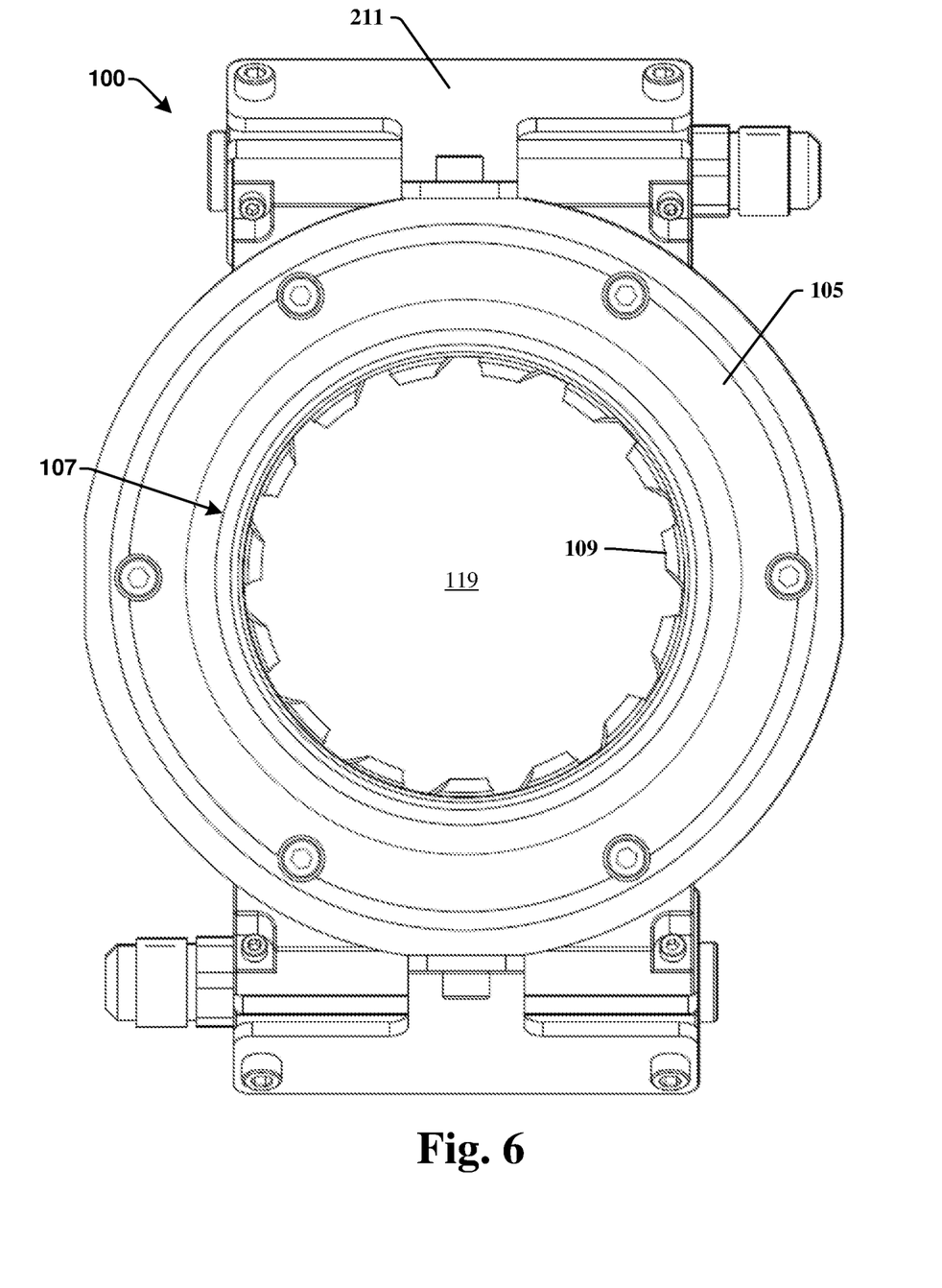
FIG. 6 illustrates a view of the air-fuel mixer of FIG. 1 from the outlet side.

With reference to FIGS. 3 and 4, the fuel injectors 111 have valve seats 235 in close proximity to or within the bores 207. A distance $D_1$ from the nozzle 205 to the air passage 119 is about 1 cm or less. The nozzle 205 may be at a perimeter of the air passage 119 or project slightly into the air passage 119. The nozzles 205 and the bores 207 are positioned so that injected fuel enters the air stream within the peripheral volume 203 (see FIG. 2) of the air passage 119.

The air passage 119 has a cross-sectional area that has a minimum that occurs in the area of the air inlet 101 and again in the area of the air outlet 107. The cross-sectional area of the air passage 119 has a maximum between the air inlet 101 and the air outlet 107. The bores 207 meet the air passage 119 at a position upstream of where the maximum occurs in an area. Where the bores 207 meet the air passage 119 an inner sidewall 241 of the air passage 119 is sloped so that the air passage 119 is widening.

With reference to FIG. 7, the inner sidewall 241 may be machined into the main part 105A prior to attaching the main part 105A to the inlet part 105C. The swirl guides 109 or the single ring-shaped part 233 that provides the swirl guides 109 may be clamped between the main part 105A and the outlet part 105B, whereby when the main part 105A is attached to the outlet part 105B is securely held in place. The fuel rails 103 may be attached to the main part 105A via the brackets 211 or otherwise either before or after attaching the main part 105A to the inlet part 105C or to the outlet part 105B. Alternatively, the inlet part 105C, the main part 105A, and the outlet part 105B may be cast or otherwise formed as a single part. Optionally, the swirl guides 109 may be formed into that same part.

Figure 8:
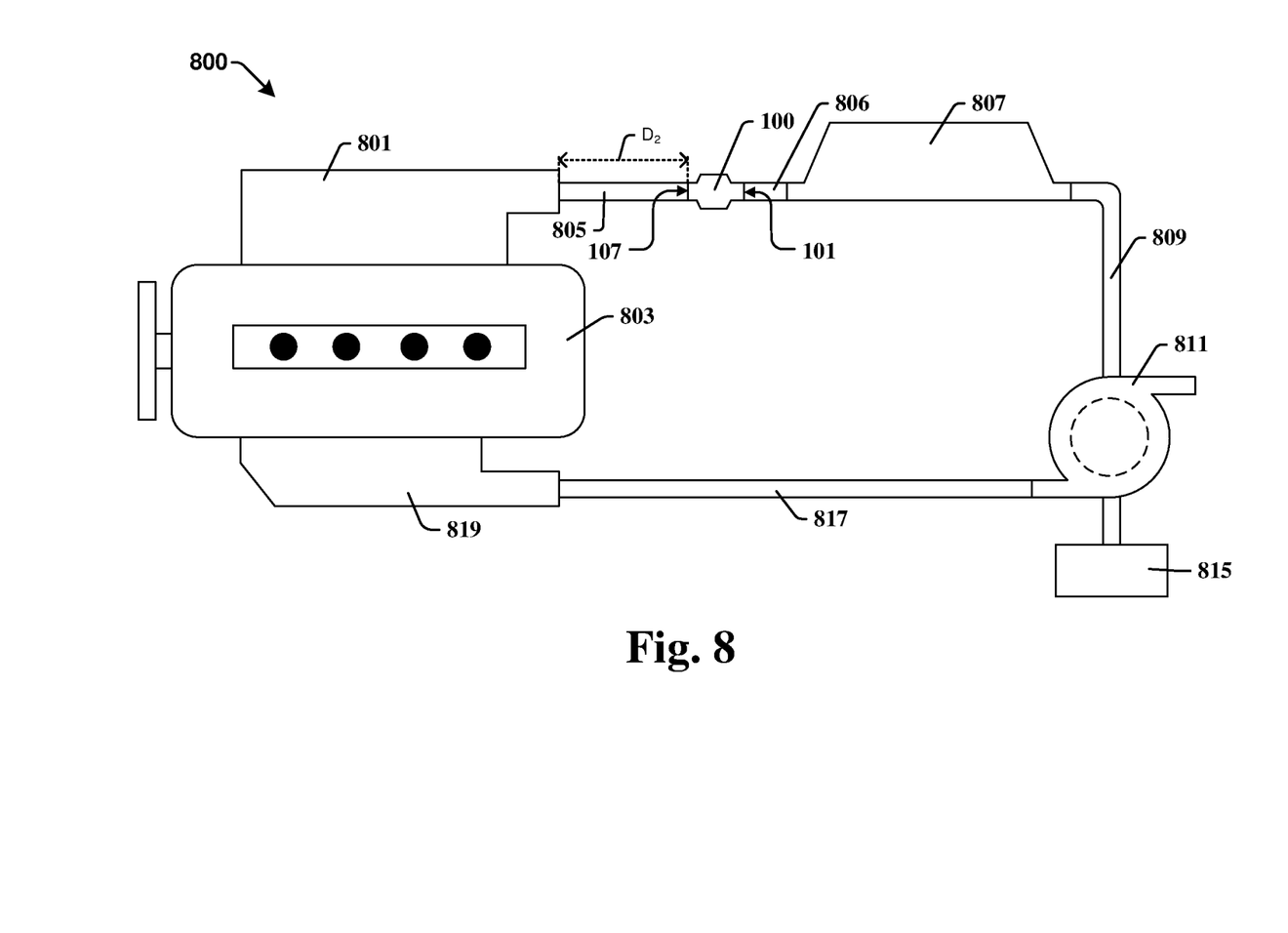
FIG. 8 illustrates a powertrain according to some other aspects of the present disclosure.

FIG. 8 illustrates a power train 800 that includes the air-fuel mixer 100. The power train 800 further includes an internal combustion engine 803 having an intake manifold 801 and an outlet manifold 819, a turbocharger 811, and an intercooler 807. A pipe 817 channels an exhaust air stream from the outlet manifold 819 to the turbocharger 811. Driven by the exhaust air stream, the turbocharger 811 compresses and heats an intake air stream drawn in through an intake air filter 815. A pipe 809 channels the compressed and heated intake air stream from the turbocharger 811 to the intercooler 807. The air-fuel mixer 100 is positioned so that the intake air stream passes through the air-fuel mixer 100 as it passes from the intercooler 807 to the intake manifold 801.

A pipe 805 of length $D_2$ connects the air outlet 107 of the air-fuel mixer 100 to the intake manifold 801. Another pipe 806 connects the air inlet 101 to the intercooler 807. In some embodiments, the length $D_2$ is in the range from about 15 cm to about 60 cm. In some embodiments, the length $D_2$ is greater than 30 cm, e.g., about 45 cm. If the length $D_2$ is too short, the fuel-air mixture may be inadequately blended before it reaches the intake manifold 801 and the fuel may spread unevenly through the intake manifold 801. It the length $D_2$ is too large the fuel pulses may be attenuated.

The pipe 809, the pipe 806, and the pipe 805 may all have the same diameter, which may also be a diameter of the air inlet 101 and of the air outlet 107. In some embodiments, the pipe 805 has a diameter in the range from about 2 cm to about 25 cm. In some embodiments, the pipe 805 has a has a diameter in the range from about 5 cm to about 15 cm. The pipe 805 may have any standard pipe size The pipe size may be matched to a size of the internal combustion engine 803. In some embodiments, the internal combustion engine 803 uses port injection. In some embodiments, the internal combustion engine 803 uses direct injection. In some embodiments, the internal combustion engine 803 is a compression ignition engine.

The power train 800 may be an OEM product to which the air-fuel mixer 100 and a controller (not shown) have been added. Installing the air-fuel mixer 100 in the power train 800 may include removing a pipe between the intercooler 807 and the intake manifold 801 and replacing it with the pipe 805, the pipe 806, and the air-fuel mixer 100. The pipe 805 and the pipe 806 may have the same diameter as the pipe that was replaced.

The controller may be programmed to control the air-fuel mixer 100 in such a way that a secondary fuel introduced through the air-fuel mixer 100 reduces consumption of a primary fuel that is supplied to the engine 803 through direct injection or port injection within the intake manifold 801. The controller may cause the secondary fuel injection rate to be dependent on such factors as a speed-load operating point of the engine 803 and throttle commands. In some embodiments, the controller limits secondary fuel injection to speed-load conditions above idle.

In some embodiments, the controller is configured to receive crankshaft position and/or camshaft position information and uses that information to time secondary fuel injection in relation to a cam cycle of the engine 803. The timing may be such that distinct fuel pulses from the air-fuel mixer 100 supply the secondary fuel to distinct cylinders of the engine 803. In some embodiments, a plurality of fuel injectors 111 on the air-fuel mixer 100 are batch fired. Batch firing may facilitate providing secondary fuel doses to distinct cylinders. The short dwell time provided by the structure of the air-fuel mixer 100 and its position within the power train 800 enable these modes of operation.

The components and features of the present disclosure have been shown and/or described in terms of certain disclosure and examples. While a particular component or feature, or a broad or narrow formulation of that component or feature, may have been described in relation to only some aspects of the present disclosure or some examples, all components and features in either their broad or narrow formulations may be combined with other components or features to the extent such combinations would be recognized as logical by one of ordinary skill in the art.

What is claimed is:

1. An air-fuel mixer, comprising: a body having an air inlet, an air outlet, and an air passage extending from the air inlet to the air outlet; a fuel injector attached to the outside of the body, wherein the fuel injector has a nozzle positioned to inject fuel into the air passage through a port in the body, the nozzle is angled toward the air outlet; and swirl guides projecting into the air passage, wherein the swirl guides are positioned to impart swirl to air flowing from the air inlet to the air outlet;
   wherein the fuel injector is one of two or more fuel injectors provided by and attached to the body by a fuel rail that abuts the body.

2. The air-fuel mixer of claim 1, wherein the plurality of fuel injectors comprise six or more.

3. The air-fuel mixer of claim 1, wherein two or more of the fuel injectors are provided by a fuel rail and have nozzles that are parallel.

4. An air-fuel mixer, comprising: a body having an air inlet, an air outlet, and an air passage extending from the air inlet to the air outlet; a fuel injector attached to the outside of the body, wherein the fuel injector has a nozzle positioned to inject fuel into the air passage through a port in the body, the nozzle is angled toward the air outlet, and the nozzle is positioned to inject fuel into the air passage through a port in the body; swirl guides projecting into the air passage, wherein the swirl guides are positioned to impart swirl to air flowing from the air inlet to the air outlet; wherein the fuel injector is provided by and attached to the body by a fuel rail that abuts the body; and wherein the nozzle is angled away from a centerline of the air passage.

5. The air-fuel mixer of claim 1, wherein the port opens onto an outer surface of the body that has a surface normal parallel to an axis of the nozzle.

6. The air-fuel mixer of claim 1, wherein:
   the port is a bore; and
   the nozzle has an outlet within the bore.

7. The air-fuel mixer of claim 1, wherein a centerline of the air passage is unobstructed.

8. The air-fuel mixer of claim 1, wherein the swirl guides are downstream from the port.

9. The air-fuel mixer of claim 1, wherein:
   the body comprises a first part and a second part that are attached together;
   the first part and the second part each define a portion of the air passage; and
   the swirl guides are held between the first part and the second part.

10. The air-fuel mixer of claim 1, wherein the air passage is wider where the port meets the air passage than at the air inlet or the air outlet.

11. An air-fuel mixer, comprising: a body having an air inlet, an air outlet, and an air passage extending from the air inlet to the air outlet; a fuel injector attached to the outside of the body, wherein the fuel injector has a nozzle positioned to inject fuel into the air passage through a port in the body, the nozzle is angled toward the air outlet, and the nozzle is positioned to inject fuel into the air passage through a port in the body; swirl guides projecting into the air passage, wherein the swirl guides are positioned to impart swirl to air flowing from the air inlet to the air outlet; wherein the fuel injector is provided by and attached to the body by a fuel rail that abuts the body; and an internal wall of the air passage is slanted where it meets the port and the air passage is widening where it meets the port.

12. The air-fuel mixer of claim 1, wherein:
   the air passage has a centerline extending from the air inlet to the air outlet;
   the air passage has a cross-sectional area that is an area of the air passage in a plane perpendicular to the centerline;
   a maximum of the cross-sectional area between the air inlet and the air outlet is four times or less a minimum of the cross-sectional area between the air inlet or the air outlet.

13. The air-fuel mixer of claim 12, wherein the maximum is two times or less the minimum.

14. The air-fuel mixer of claim 1, wherein
   the air passage comprises a core volume extending from the air inlet to the air outlet, wherein the core volume has a cross-section corresponding to at least one of the air inlet or the air outlet; and
   75% or more of the core volume as viewed from the air inlet is unobstructed.

15. The air-fuel mixer of claim 14, wherein 90% or more of the core volume as viewed from the air inlet is unobstructed.

16. The air-fuel mixer of claim 1, wherein
   the air passage has a core volume extending from the air inlet to the air outlet, wherein the core volume has a cross-section corresponding to at least one of the air inlet or the air outlet;
   the air passage has a peripheral volume surrounding the core volume; and
   a majority of a volume of the swirl guides that projects into the air passage is within the peripheral volume.

17. The air-fuel mixer of claim 1, wherein the swirl guides slant toward a center of the air passage.

\* \* \* \* \*